US010918029B2

(12) United States Patent
Henry

(10) Patent No.: US 10,918,029 B2
(45) Date of Patent: Feb. 16, 2021

(54) SURGE VALVE ASSEMBLY

(71) Applicant: THE BOARD OF TRUSTEES OF THE UNIVERSITY OF ARKANSAS, Little Rock, AR (US)

(72) Inventor: Christopher Garrett Henry, Stuttgart, AR (US)

(73) Assignee: THE BOARD OF TRUSTEES OF THE UNIVERSITY OF ARKANSAS, Little Rock, AR (US)

( * ) Notice: Subject to any disclaimer, the term of this patent is extended or adjusted under 35 U.S.C. 154(b) by 0 days.

(21) Appl. No.: 16/522,201

(22) Filed: Jul. 25, 2019

(65) Prior Publication Data
US 2020/0029515 A1    Jan. 30, 2020

Related U.S. Application Data

(60) Provisional application No. 62/703,105, filed on Jul. 25, 2018.

(51) Int. Cl.
*A01G 25/02* (2006.01)
*A01G 25/16* (2006.01)

(52) U.S. Cl.
CPC ............ *A01G 25/02* (2013.01); *A01G 25/16* (2013.01); *A01G 25/165* (2013.01)

(58) Field of Classification Search
CPC ....... A01G 25/02; A01G 25/16; A01G 25/165
See application file for complete search history.

(56) References Cited

U.S. PATENT DOCUMENTS

| 4,535,813 | A | * | 8/1985 | Spain | A01G 25/162 137/625.5 |
| 4,676,264 | A | * | 6/1987 | Wiseman | A01G 25/162 137/119.07 |
| 4,711,272 | A | * | 12/1987 | Wiseman | A01G 25/162 137/242 |
| 4,726,529 | A | * | 2/1988 | Nislar | A01G 25/09 239/536 |
| 5,839,658 | A | * | 11/1998 | Sarver | A01G 25/167 239/1 |

(Continued)

OTHER PUBLICATIONS

Henry et al.; Surge Irrigation informational; All; May 1, 2017 (Year: 2017).*

(Continued)

*Primary Examiner* — Benjamin F Fiorello
(74) *Attorney, Agent, or Firm* — Michael Best & Friedrich LLP

(57) ABSTRACT

A surge irrigation system includes a main inlet pipe configured to be coupled to a source of pressurized water. The main inlet pipe is coupled to a flow meter for the purpose of improving furrow irrigation. The system further includes two independent, valve-actuated and controlled pipe arm segments extending from the main inlet pipe. One of the pipe arm segments extends toward a first irrigation zone in a field, and the second pipe arm segment extends toward the second irrigation zone in the field. The system further includes water advance sensors for the purpose of improving a surge irrigation program for an improved autonomous and parameter-setting operation. Additionally the controller, sensor and interface use radio communication.

20 Claims, 9 Drawing Sheets

(56) References Cited

U.S. PATENT DOCUMENTS

| | | | | |
|---|---|---|---|---|
| 9,599,286 B2* | 3/2017 | Hurst | ............... | F17D 3/00 |
| 2003/0182022 A1* | 9/2003 | Addink | ............... | A01G 25/16 |
| | | | | 700/284 |
| 2004/0236443 A1* | 11/2004 | Ware | ............... | G05B 19/0421 |
| | | | | 700/90 |
| 2005/0199842 A1* | 9/2005 | Parsons | ............... | E03D 3/02 |
| | | | | 251/129.04 |
| 2010/0030476 A1* | 2/2010 | Woytowitz | ............... | A01G 25/16 |
| | | | | 702/3 |
| 2011/0307203 A1* | 12/2011 | Higgins | ............... | G05B 15/02 |
| | | | | 702/84 |
| 2013/0085619 A1* | 4/2013 | Howard | ............... | G05D 7/0623 |
| | | | | 700/284 |
| 2018/0295796 A1* | 10/2018 | Woytowitz | ............... | A01G 25/162 |
| 2018/0352759 A1* | 12/2018 | Socolsky | ............... | A01G 25/02 |
| 2019/0159411 A1* | 5/2019 | Gungl | ............... | A01G 25/167 |
| 2019/0307083 A1* | 10/2019 | Henry | ............... | A01G 25/06 |

OTHER PUBLICATIONS

Wood et al., "Surge Irrigation Reduces Irrigation Requirements for Soybean on Smectitic Clay-Textured Soils," Crop, Forage & Turfgrass Management, vol. 3, Issue 3, Aug. 2017, 6 pages.

* cited by examiner

SURGE VALVE ASSEMBLY

CROSS-REFERENCE TO RELATED APPLICATION(S)

This application is a non-provisional of and claims priority to U.S. Provisional Application No. 62/703,105, filed Jul. 25, 2018, the entire contents of which are incorporated herein by reference.

BACKGROUND

Agricultural irrigation systems often rely on furrow and flood-irrigation methods to provide water to crops in fields. Furrow and flood-irrigation methods are widely used throughout the world, including for example Argentina, Brazil, China, India, Pakistan and several European countries, as well as the United States. These methods include pumping water onto a sloped field planted with crops, and allowing the water to move through the field (for example along furrows in the field) from a higher elevation to a lower elevation to provide water to various rows of crops.

Furrow and flood-irrigation methods sometimes include use of surge irrigation. Surge irrigation is the intermittent application of water to a furrow in an irrigated field. Distribution can be done with gated irrigation pipe or more recently with lay flat poly irrigation pipe. Surge irrigation is used to improve the down furrow distribution uniformity. Surge irrigation works on the principle that dry soil has a higher infiltration rate than when it is saturated. When soil is wetted, the soil seals because soil particles at a surface of the soil consolidate. When water is re-introduced into a furrow that has been wetted, a wetting front of the water (i.e., a leading edge of the flow of water moving down the field) advances or moves quickly past the wetted soil in the furrow continuing the advance down the furrow. When the wetting front reaches the dry soil interface, the advance is slowed as water is infiltrated. This phenomena allows for a faster advance through the field with less deep percolation and better application uniformity. The end result, therefore, is a more even distribution of water in a rooting zone between the inlet or crown and the end of the furrows, and reduced nutrient loss from deep percolation across the entire field.

Surge irrigation is often performed through one or more cycles that each involve an advance stage and a soak stage. During the advance stage, water is directed down the field, and during a soak stage the water is allowed to soak into the soil. The flow of water during these stages is controlled by a surge valve. The surge valve may be coupled for example to the poly-tubing or gated pipe at the top of the field to intermittently apply water to the various furrows in the field. For example, the surge valve may be coupled to two separate water distribution pipes. The surge valve allows water to be directed to one side of a field (for example to one or more sets of furrows) for a predetermined period of time out of one of pipes, and for the water to be applied to another side of the field (for example to one or more different sets of furrows) for a predetermined time out of the other pipe. Typically, two sets are irrigated simultaneously with the surge valve oscillating the irrigation supply to one set and then the other until both have received an ample application.

Current surge valves (for example produced by P&R Surge Systems, Inc.) include an electronic programmable controller and an aluminum mechanized flap valve that diverts water from one pipe to the other (and thus from to one side of the field to the other). This is referred to as a right and left side valve. Commercial Surge valves have advance and soak modes. The valve starts out in the advance mode and then moves into the soak mode after the advance stage has been reached. It continues indefinitely in the soak mode until it is shut off. The advance phase programming increases the advance times progressively to account for the additional time to traverse wetted soil. Additionally, the controller can be programmed with different number of advance cycles and automatically calculates the number of advance cycles and individual advance cycle times based on the user input of the total advance time for the water to reach the end of the furrow. This is estimated by the irrigator initially and adjusted programmatically during the early part of the advance phase.

Surge irrigation adoption and use is very low. There are several reasons. First, irrigators do not generally understand how to use or set surge valves, as the concept of the surge phenomenon may be difficult to understand. Second, the irrigator must observe the water advance during an irrigation set and adjust to set the advance time correctly. If set too low, the advance may be significantly delayed. If set too long then irrigation efficiency will be reduced due to long advances that result in excessive tail water.

Another problem is that flow rates change during the season so a valve set early in the season may need adjustment as the flow changes during the season from well drawdown. An additional problem that prohibits surge irrigation is power interruption from utility load management programs. If power is interrupted during the advance phase, then more water will be applied to one side of the field than the other creating a problem with advancing water through the field.

Another problem is that the amount of water or flow rate used and needed during irrigations changes over time. For example, it is well known by irrigators that the first irrigation requires more water than subsequent irrigations, because the soil has not consolidated from an irrigation. Next, it is well known that flowrates from wells and water sources decline over time from drawdown, thus the flow rate at the beginning of an irrigation season is higher than the end of the season, generally around 20% different but can be as much as 50%. The advance time needed to complete an irrigation is a function of the flowrate applied. Generally, most irrigators only program a surge valve once during the start of the season. Thus, subsequent irrigations may have reduced efficiency and inadequate irrigation volume applied, negating the very advantage of surge irrigation.

SUMMARY

A first embodiment includes a surge irrigation system. The system includes a main inlet pipe configured to be coupled to a source of pressurized water. The system further includes a first pipe arm extending and branching off from the main inlet pipe and configured to extend toward a first irrigation zone in a field, and a second pipe arm extending and branching off from the main inlet pipe and configured to extend toward the second irrigation zone in the field. The system further includes a first independently controlled valve configured to control water flow through the first pipe arm and a second independently controlled valve configured to control water flow through the second pipe arm allowing for true cutback irrigation and cessation of the irrigation event unattended.

A second embodiment includes a surge irrigation system. The system includes a main inlet pipe configured to be coupled to a source of pressurized water. The system further includes a first pipe arm extending and branching off from the main inlet pipe and configured to extend toward a first irrigation zone in a field, and a second pipe arm extending and branching off from the main inlet pipe and configured to extend toward the second irrigation zone in the field. The system further includes an independently controlled valve configured to control water flow through at least one of the first pipe arm and second pipe arm, and a flow meter disposed adjacent the independently controlled valve.

A third embodiment includes a surge irrigation system. The system includes wireless devices to communicate key parameters, flow rate, application amount, irrigation time, and adjust to conditions from the user's smart phone or web browser.

A fourth embodiment includes a surge irrigation system. The system includes an advance sensor coupled to the system that adjusts an advance time automatically for the user without input.

Other aspects of the invention will become apparent by consideration of the detailed description and accompanying drawings.

It should be understood that the invention is not limited in its application to the details of embodiment and the arrangements of the components set forth in the following description or illustrated in the above-described drawings. The invention is capable of other embodiments and of being practiced or being carried out in various ways. Also, it is to be understood that the phraseology and terminology used herein is for the purpose of description and should not be regarded as limiting.

DETAILED DESCRIPTION

FIGS. 1-4 illustrate a system 10 for use in irrigating an agricultural field 14. The field 14 may be any type of field for planting and growing a crop (e.g., rice, corn, cotton, wheat, grain, sorghum, etc.), and may have any size and shape.

Figure 1:
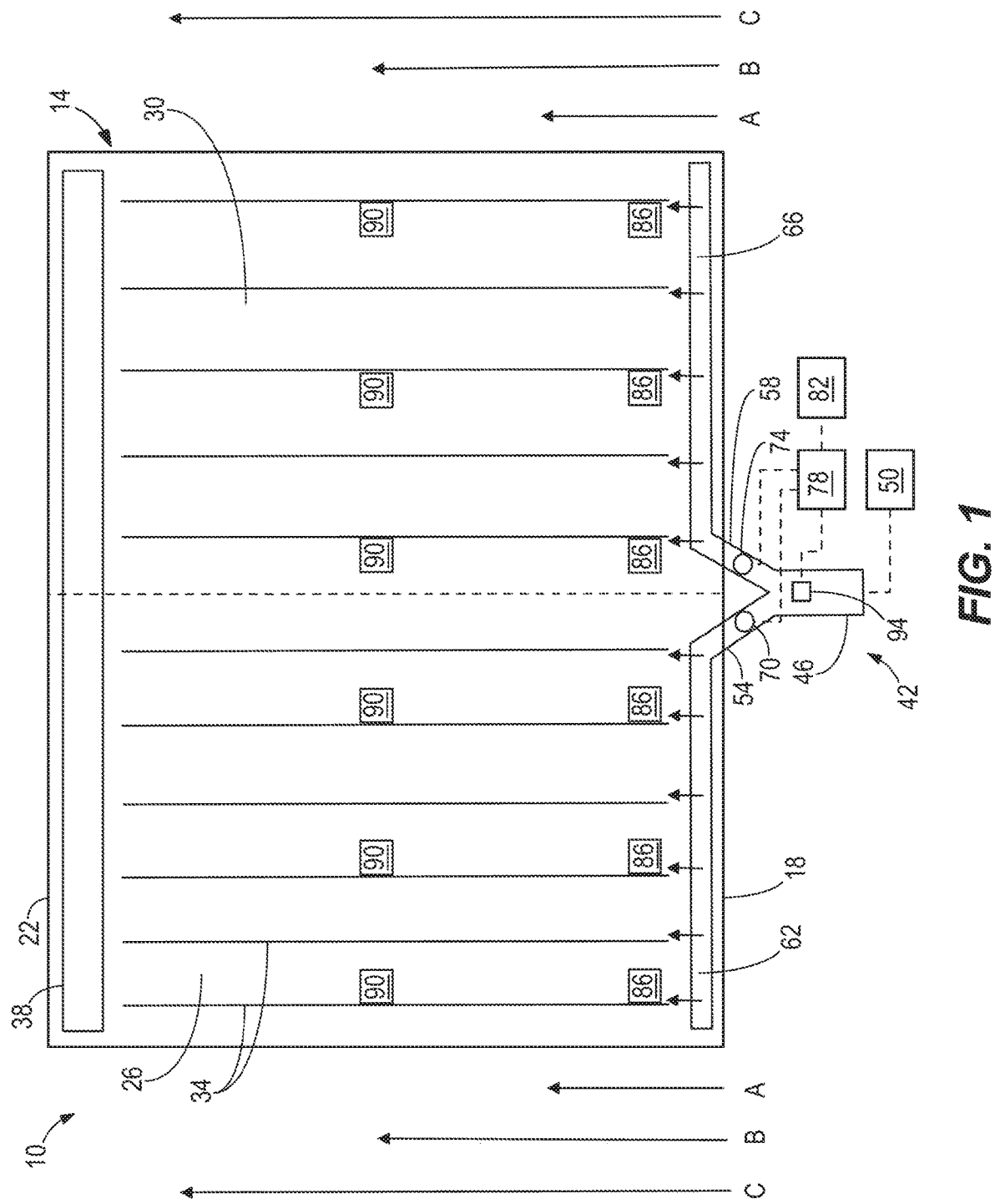
FIG. 1 is a schematic view of a surge valve assembly.

As illustrated in FIG. 1, the field 14 includes a first (e.g., top) end 18, and a second (e.g., bottom) opposite end 22. The field 14 may be sloped, such that the first end 18 is positioned at a higher elevation than the second end 22. For example, in some embodiments the first end 18 is positioned between approximately 1-4 feet higher than the second end 22. The first end 18 may be positioned, for example, at a slope of 0 to 5% higher than the second end 22. Other embodiments include different ranges and values.

With continued reference to FIG. 1, the field 14 is divided in half (as illustrated by the vertical dashed line) into a first irrigation zone 26 and a second irrigation zone 30. The first and second irrigation zones 26, 30 are separately-irrigated areas of the field 14, and are of generally equal size and shape. In other embodiments the field 14 may be divided into four zones. Additionally, while the illustrated zones 26, 30 are of equal size and shape, in some embodiments one zone may be larger than another zone, or may have a different shape than another zone.

The field 14 further includes a plurality of furrows 34 extending from the first end 18 to the second end 22, and a tail ditch 38 extending along the second end 22 and generally perpendicular to the furrows 34. The tail ditch 38 collects and transfers tail water, and in some embodiments directs it to a pump, ditch, pipes or other device or system for collecting or discharging the tail water from the field or farm.

With continued reference to FIG. 1, the system 10 includes a surge valve assembly 42. The surge valve assembly 42 includes a main inlet pipe 46 that is coupled to a source of pressurized water 50. The surge valve assembly 42 further includes a first pipe arm 54 extending and branching off from the main inlet pipe 46 toward the first irrigation zone 26, and a second pipe arm 58 extending and branching off from the main inlet pipe 46 toward the second irrigation zone 30. The main inlet pipe 46, the first pipe arm 54, and the second pipe arm 58 form a Y-shaped piping structure at the first end 18 of the field 14. While the illustrated Y-shaped structure is generally centrally located along the first end 18, in other embodiments the Y-shaped piping structure may be located in other locations. In other embodiments the structure is T-shaped such as for gated pipe.

Figure 2:
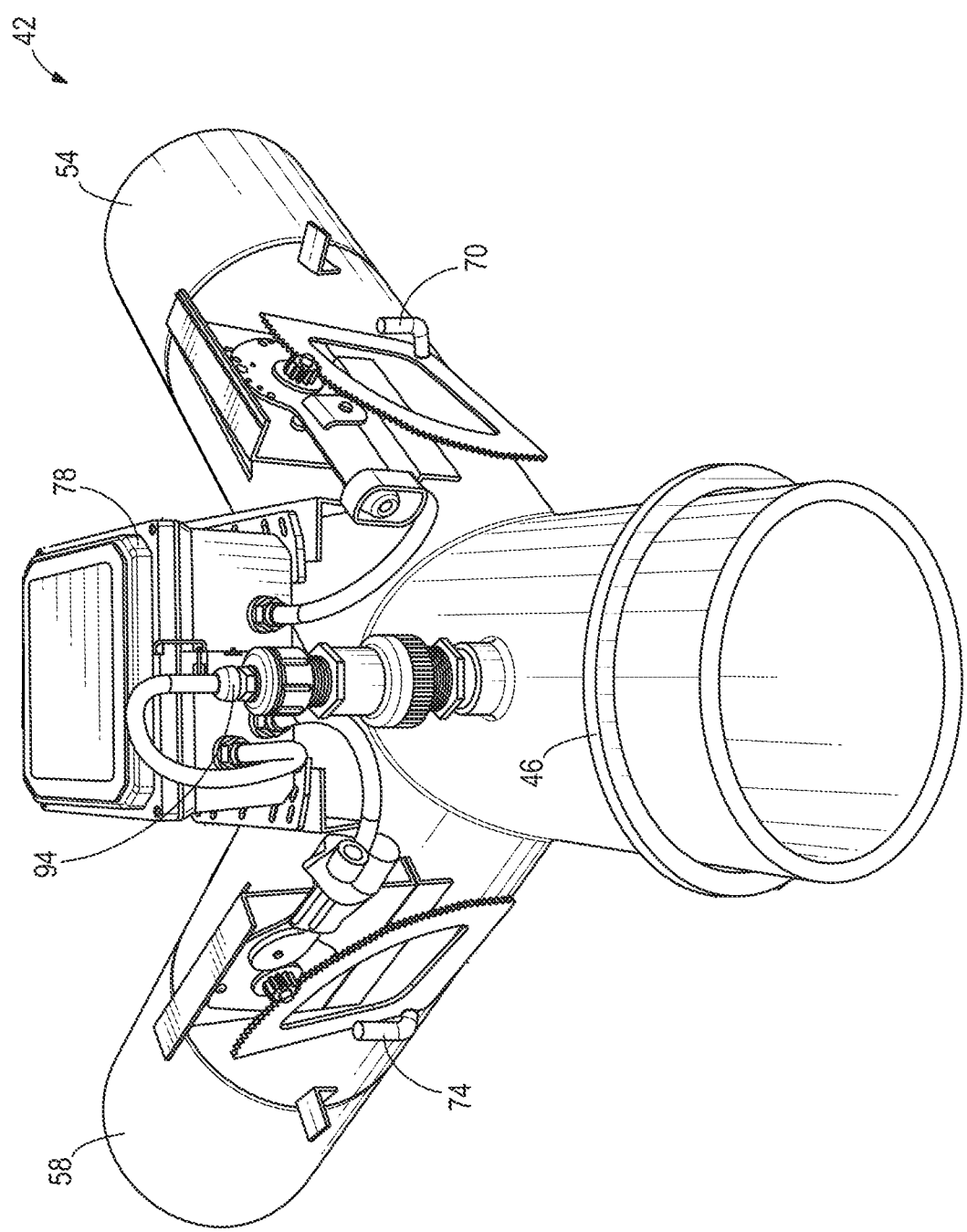
FIGS. 2-4 are close-up perspective views of a surge valve of the surge valve assembly.
Figure 3:
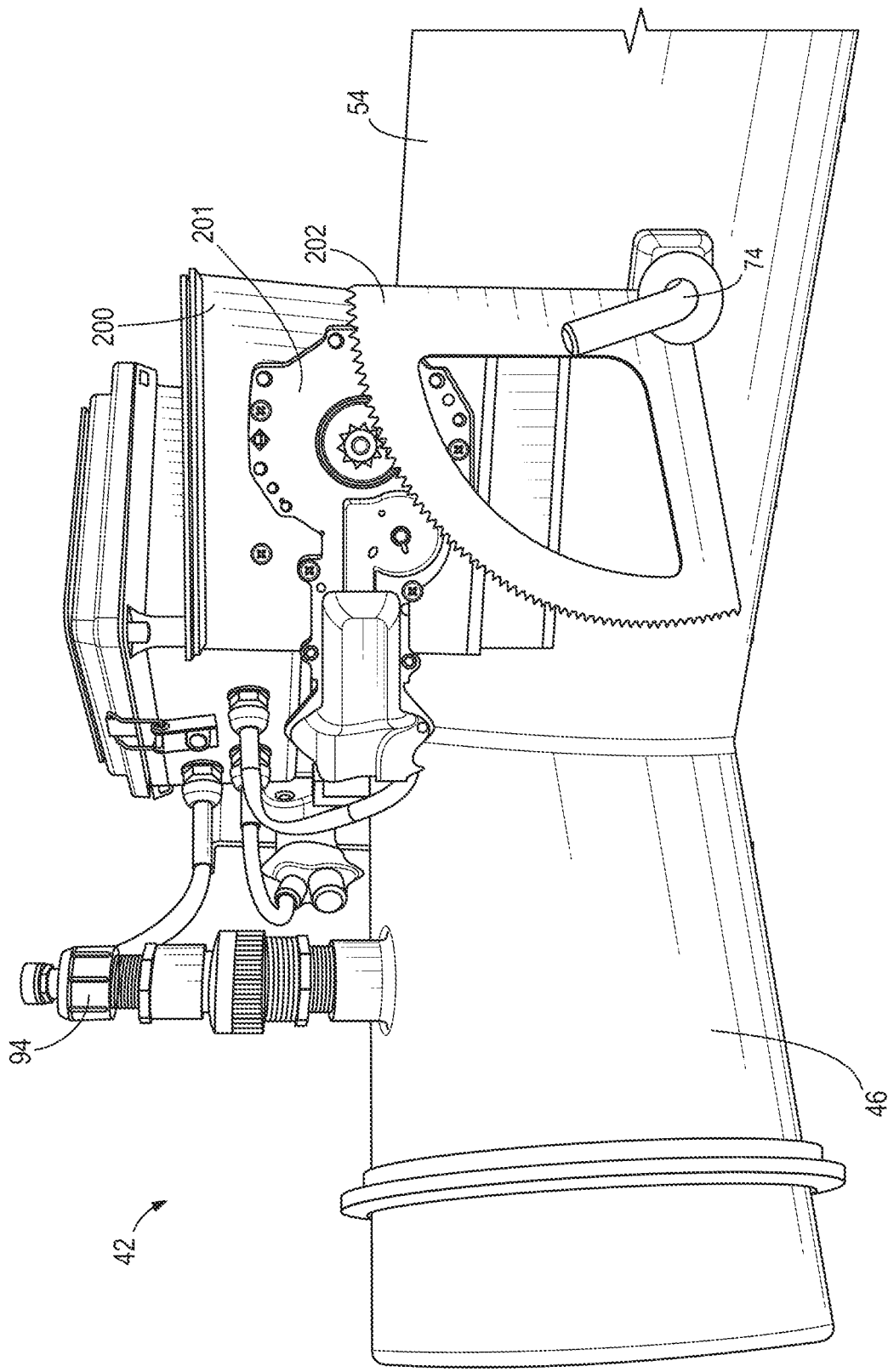
Figure 4:
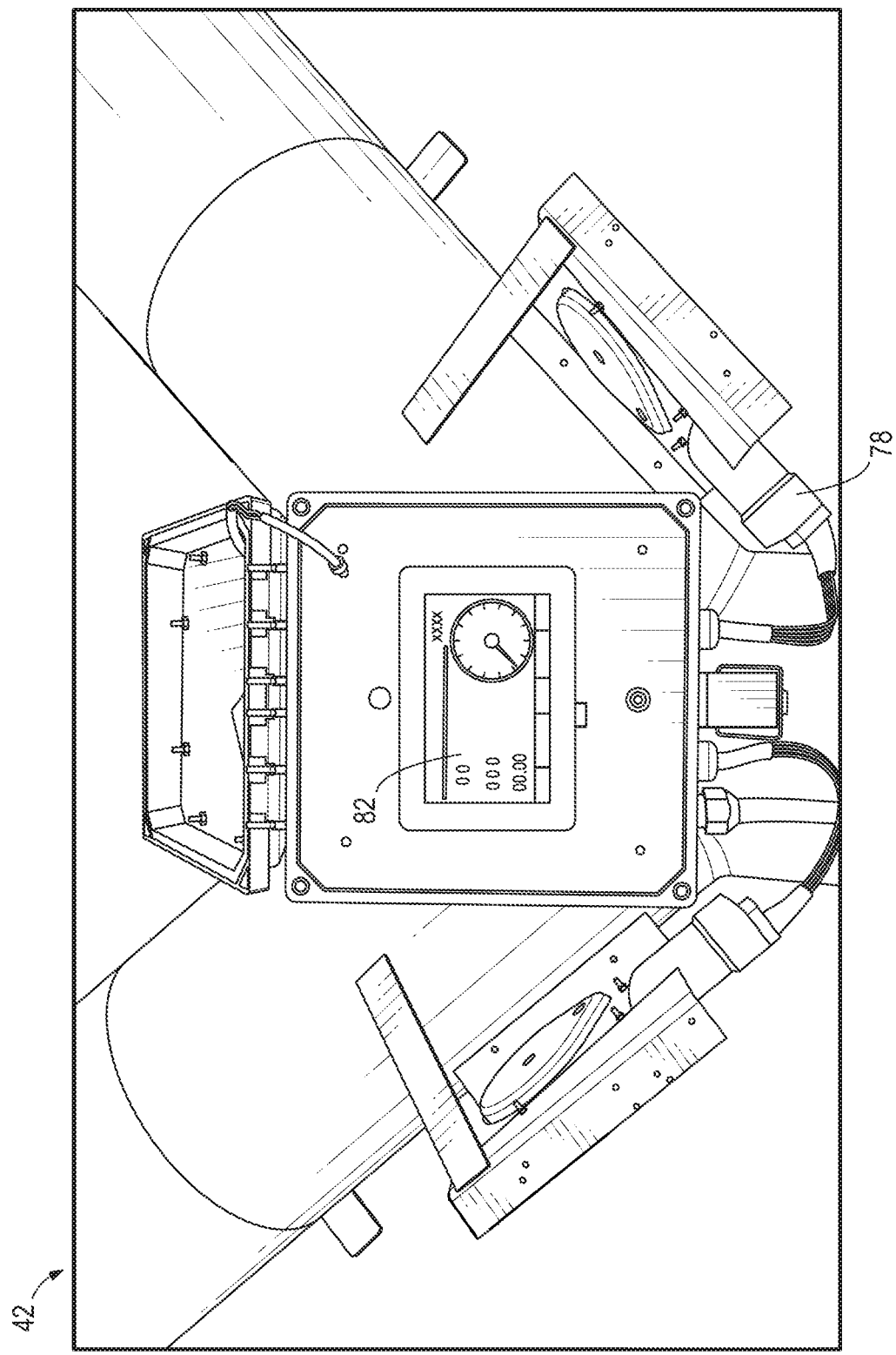

As illustrated in FIGS. 2-4, each of the main inlet pipe 46, the first pipe arm 54, and the second pipe arm 58 may be made of a rigid metal and/or plastic material, or any other suitable material, and may have a rounded, cylindrical shape or any other shape suitable for directing water toward the field 14. Other embodiments include various other shapes, sizes, and materials than that illustrated.

With reference to FIG. 1, in the illustrated embodiment the first pipe arm 54 is coupled to a first lay-flat pipe 62 and the second pipe arm 58 is coupled to a second lay-flat pipe 66. Each of the lay-flat pipes 62, 66 extends along the first end 18 of the field 14, and includes a plurality of holes (not shown) for dispersing water out into the field 14 (i.e., into one of the first and second zones 26, 30). The holes may be formed and/or arranged, for example, by Computerized Hole Selection (CHS) such as Delta Plastics Pipe Planner or PHAUCET (Pipe Hole And Uniform Crown Evaluation Tool). CHS allows for hydraulic iteration of pressure, row length, and elevation so that each furrow 34 receives a proportional amount of water for a row length. The CHS may also provide for uniform distribution of irrigation water across a crown of the lay-flat pipes 62, 66. In other embodiments, the pipe is rigid with plastic gates that are adjusted manually by the irrigator. The plastic gates control a plurality of holes used to distribute water to furrows across the crown of the field adjusted manually by the irrigator.

With continued reference to FIG. 1, the surge valve assembly 42 includes a first independent valve 70 that controls water movement through the first pipe arm 54 and a second independent valve 74 that controls water movement through the second pipe arm 58. The first valve 70 may be disposed entirely within the first pipe arm 54, or at a junction between the main inlet pipe 46 and the first pipe arm 54. The second valve 74 may be disposed entirely within the second pipe arm 58, or at a junction between the main inlet pipe 46 and the second pipe arm 58. The valves 70, 74 may be any of a number of valves, including for example butterfly valves, spring-biased valves, solenoid valves, etc. The valves 70, 74 may be moved for example via motors (for example small DC motors) and gears. A large gear may be used to create leverage to move the valves 70, 74, although other embodiments may use a worm gear or other gear and direct current motor drive. The valves 70, 74 may be made of aluminum, glass filled nylon, or other suitable material.

In some embodiments, the system 10 additionally or alternatively includes one or more sensors (e.g., sensor stations) that include for example flow meters 94 (e.g., insertion meters, propellers, magnetic flow meters, etc.) that are part of or in proximity to the valves 70, 74. FIG. 1 illustrates a single flow meter 94 disposed upstream of the valves 70, 74 (e.g., within the main inlet pipe 46). In other embodiments multiple flow meters 94 may instead be used (e.g., one each disposed upstream of one of the valves 70, 74). The flow meter or meters 94 monitor flow rates of water through the valves 70, 74. If the flow rate suddenly changes, the flow meter 94 may communicate this change to a controller 78, and the controller 78 may use the information to adjust the advance time, the number of advance cycles, soak time, cutback time, cutback percentage, total irrigation set time, or other parameters during the surge operation. For example, the controller 78 may increase or decrease the advance time depending on the information received from the flow meter 94. The controller 78 may also use this information to determine when to end the irrigation event and close both valves. The flowmeter data would also be used by controller 78 to ensure that the flow to the field has stopped. The flow data may also be used by controller 78 automatically start the surge irrigation program when flow is first measured.

Figure 6:
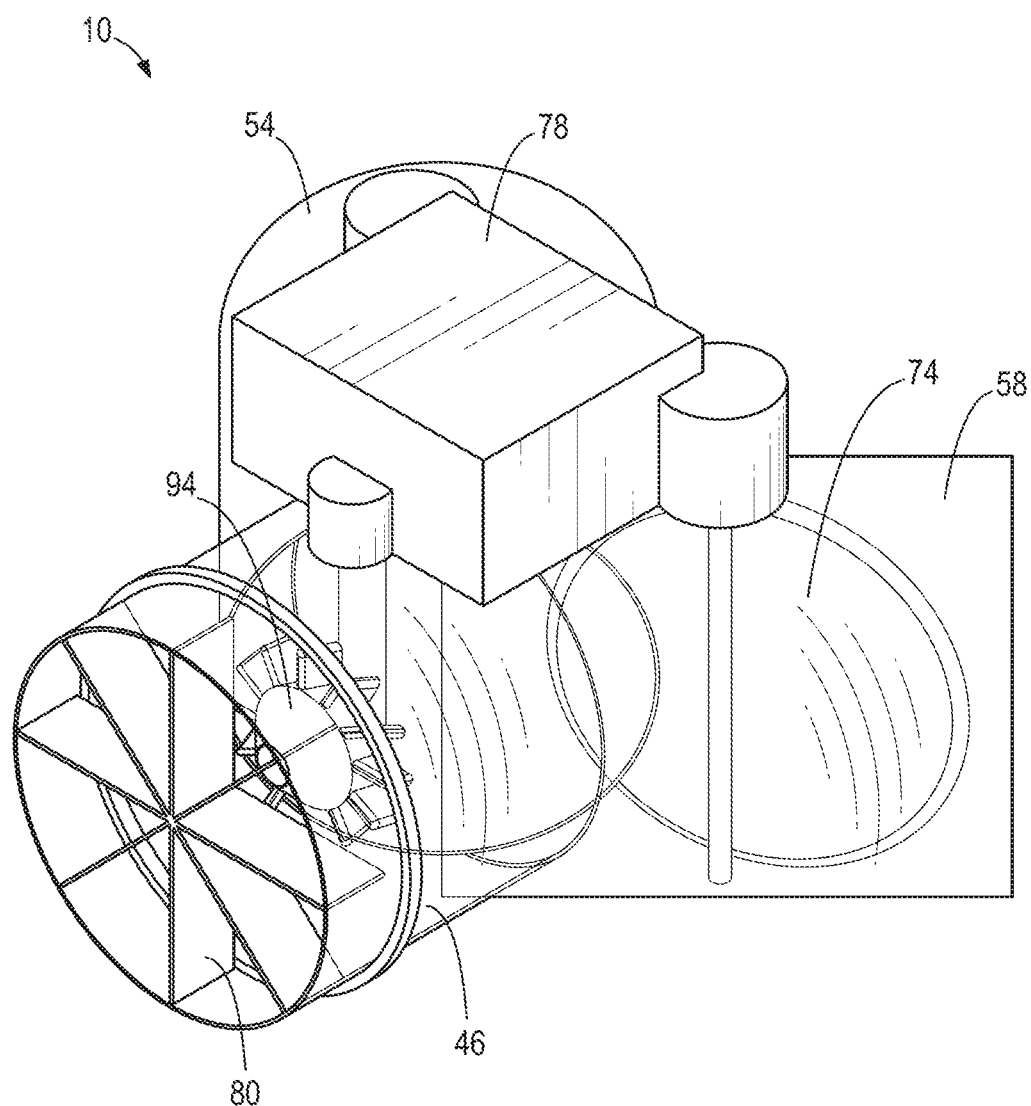
Figure 9:
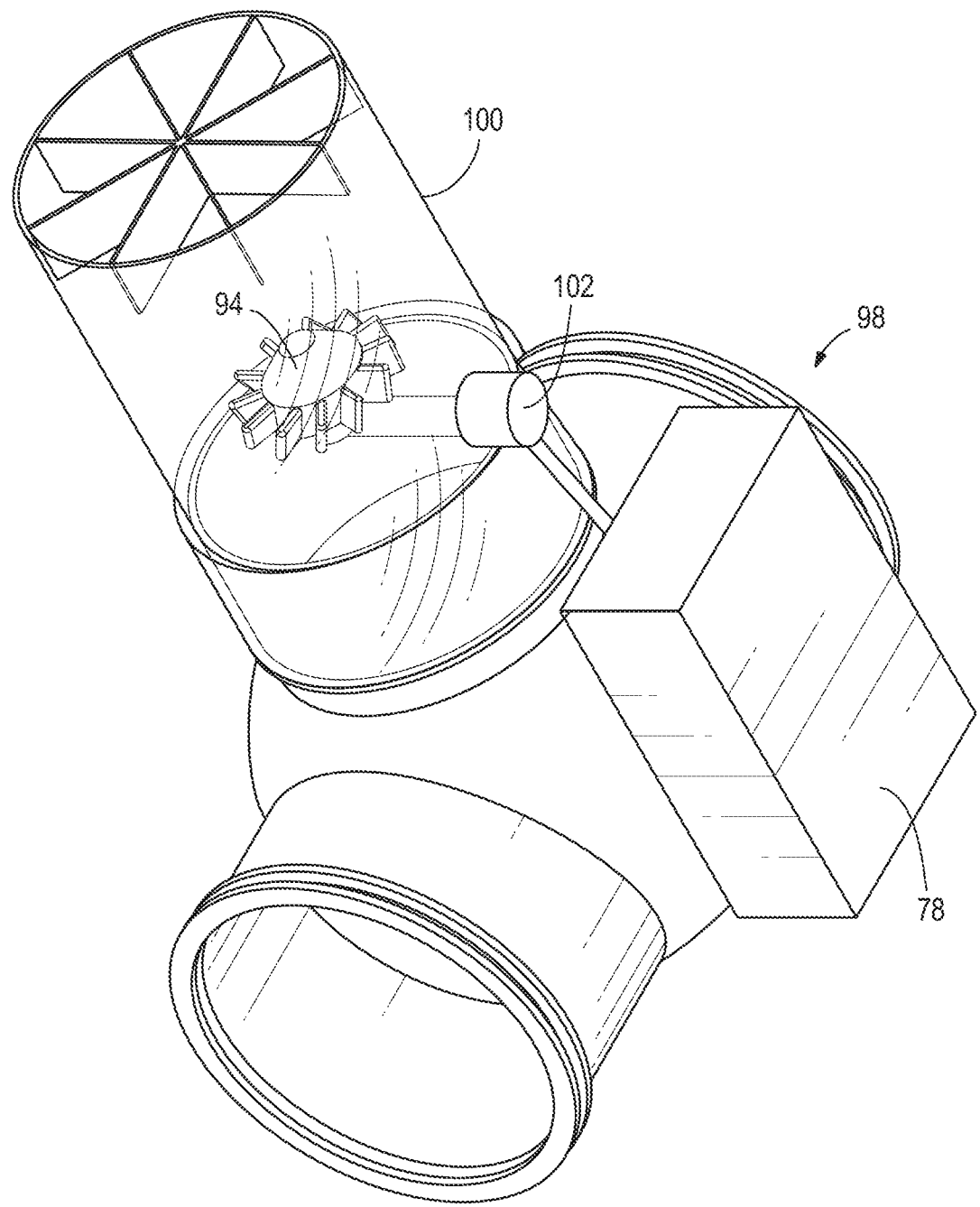
FIG. 9 is a perspective view of a flow meter of the assembly of FIG. 1, coupled to the traditional surge valve of FIG. 8.

As illustrated in FIGS. 6 and 9, in another embodiment (e.g., a retrofit embodiment) the flow meter 94 may be used in conjunction with a traditional flapper surge valve (e.g., the P&R valve) 98, where the flow meter 94 is closely, permanently or semi-permanently attached to the valve and provides digital flow data to the controller 78. As illustrated in FIG. 9, the valve 98 may include a tube 100 and adapter 102 to accommodate the added flow meter 94, the adapter 102 connecting the flow meter 94 to a controller 78. This may allow the controller 78 to report application depth to the user, pause the program and resume from a power interruption.

As illustrated in FIG. 1, each of the valves 70 and 74 are coupled (for example wirelessly via Bluetooth®, RF, cloud, internet, or via other communication) to the controller 78 (for example microcontroller). The controller 78 may be located on or within the main inlet pipe 46, the first pipe arm 54, the second pipe arm 58, or any other structure. In some embodiments the controller 78 is located remotely from the field 14. As illustrated in FIG. 1, the controller 78 may be coupled to a display 82. The display 82 may also be located on or within the main inlet pipe 46, the first pipe arm 54, the second pipe arm 58, or any other structure, or may be located remotely from the field 14. The display 82 (e.g., graphical user interface) may include one or more user input features (for example a touchscreen, keypad, etc.) that allows a user to enter information into the controller 78, and to set up irrigation schedules or programs. In yet other embodiments, the controller 78 may receive signals (for example low energy Bluetooth® or cellular or other signals from a phone or other smart device) giving the controller 78 commands or programs to execute. The controller 78 may restart a surge irrigation program if interrupted and may terminate an irrigation set when a desired water application depth in the field 14 has been obtained. With reference to FIG. 3, in some embodiments the surge valve assembly 42 includes a bracket 200 that supports a DC motor 201 that drives a gear 202 that operates the valve 70 and/or 74 (e.g., the valve 70 or 74 being a butterfly valve). Other embodiments of this include valve actuators or other DC motor means to open and close the butterfly valve 74.

The controller 78 is configured to control each of the valves 70, 74 separately. Thus, the controller 78 may open the first valve 70 fully while closing the second valve 74, open the second valve 74 only partially, or may open the second valve 74 fully and vice versa. The controller 78 may open both valves 70, 74 simultaneously to a fully open position for a cutback mode or to a partially open position, or close both valves 70, 74 fully to stop all flow. Partial and complete opening and closing of the valves 70, 74 controls the flow of water moving from the main inlet pipe 46 (i.e., from the pressurized water source 50) to each of the zones 26, 30 in the field. Most notably, the controller has the ability to end an irrigation event based on application depth entered by the user and stop the application of water by closing both valves. Additionally, both valves can be opened to provide cutback irrigation, or to cutback the flow rate delivered to the pipes to improve the opportunity time for the water to soak in at the lower infiltration rates. Additionally for cutback mode, when both valves are opened, they can be closed slightly, as set by the user, in this mode to further reduce the flow rate delivered to the pipes for cutback irrigation. For example commercially available valves attempt to simulate cutback irrigation through rapid oscillations performed in the soak cycles. However, they are only able to cutback flow back 50%. Valves 70, 74 are able to cutback over a wider range of flow reductions than a single valve configuration 98.

The controller 78 controls how much water is directed to each zone 26, 30, and for how long. Thus, the controller 78 controls various advance stages (i.e., where water is directed out of the lay-flat pipes 62, 66 and down the furrows toward the second end 22 of the field 14), and soak stages (i.e., where the water is allowed time to soak into the soil). The controller 78 may cycle valves back and forth to provide advance, soak and cutback modes.

Figure 5:
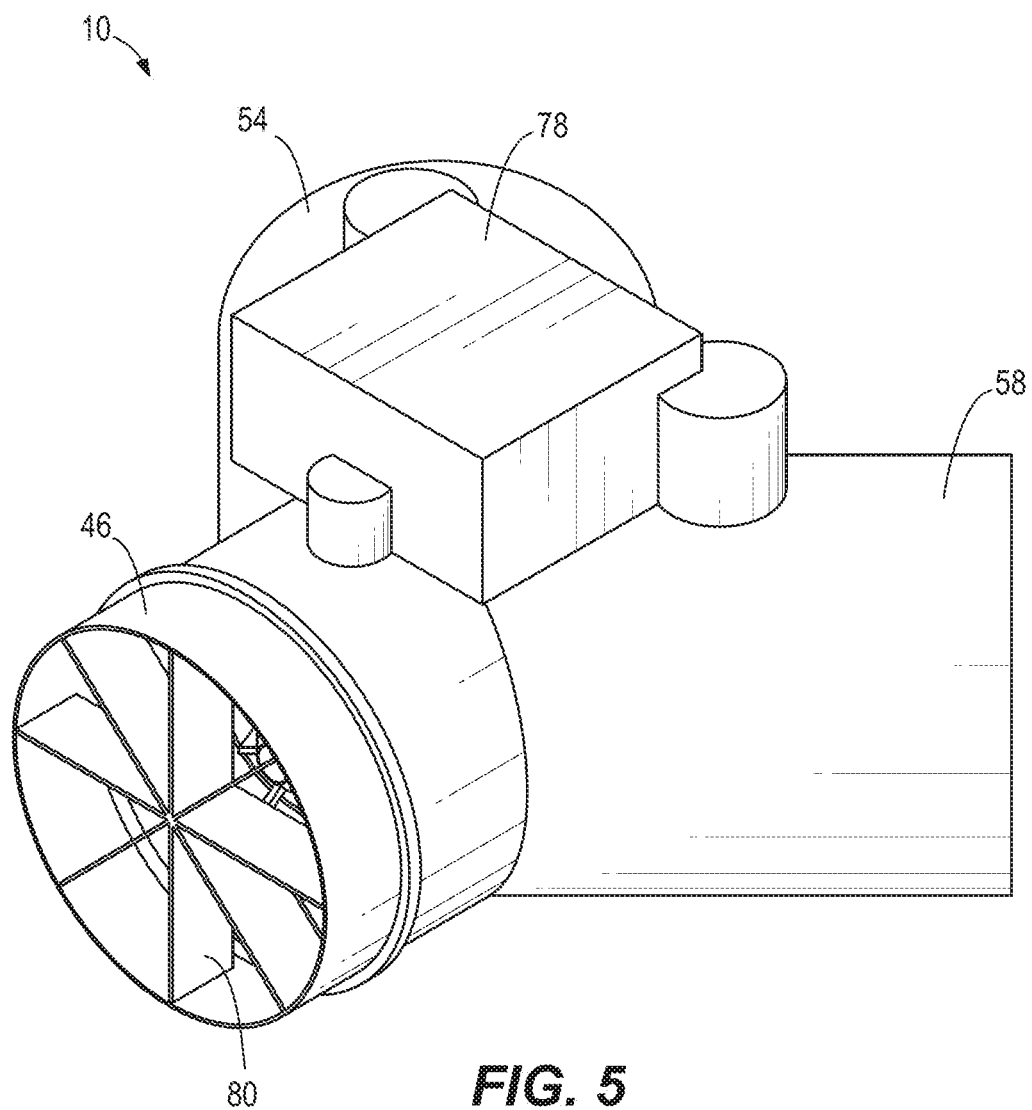
FIGS. 5 and 6 are perspective partial views of the surge valve assembly.

With reference to FIGS. 5 and 6, in some embodiments the system 10 includes the main inlet pipe 46, the first pipe arm 54, and the second pipe arm 58, as well as the controller 78, the flow meter 94, and the valves 70, 74. In the illustrated construction the valves 70, 74 are butterfly valves, the flow meter 94 is a propeller flow meter disposed upstream of the valves 70, 74. As illustrated in FIGS. 5 and 6, in some embodiments the system 10 includes straightening vanes 80 that straighten a flow of water before the water reaches the flow meter 94 and the first and second pipe arms 54, 58.

Figure 7:
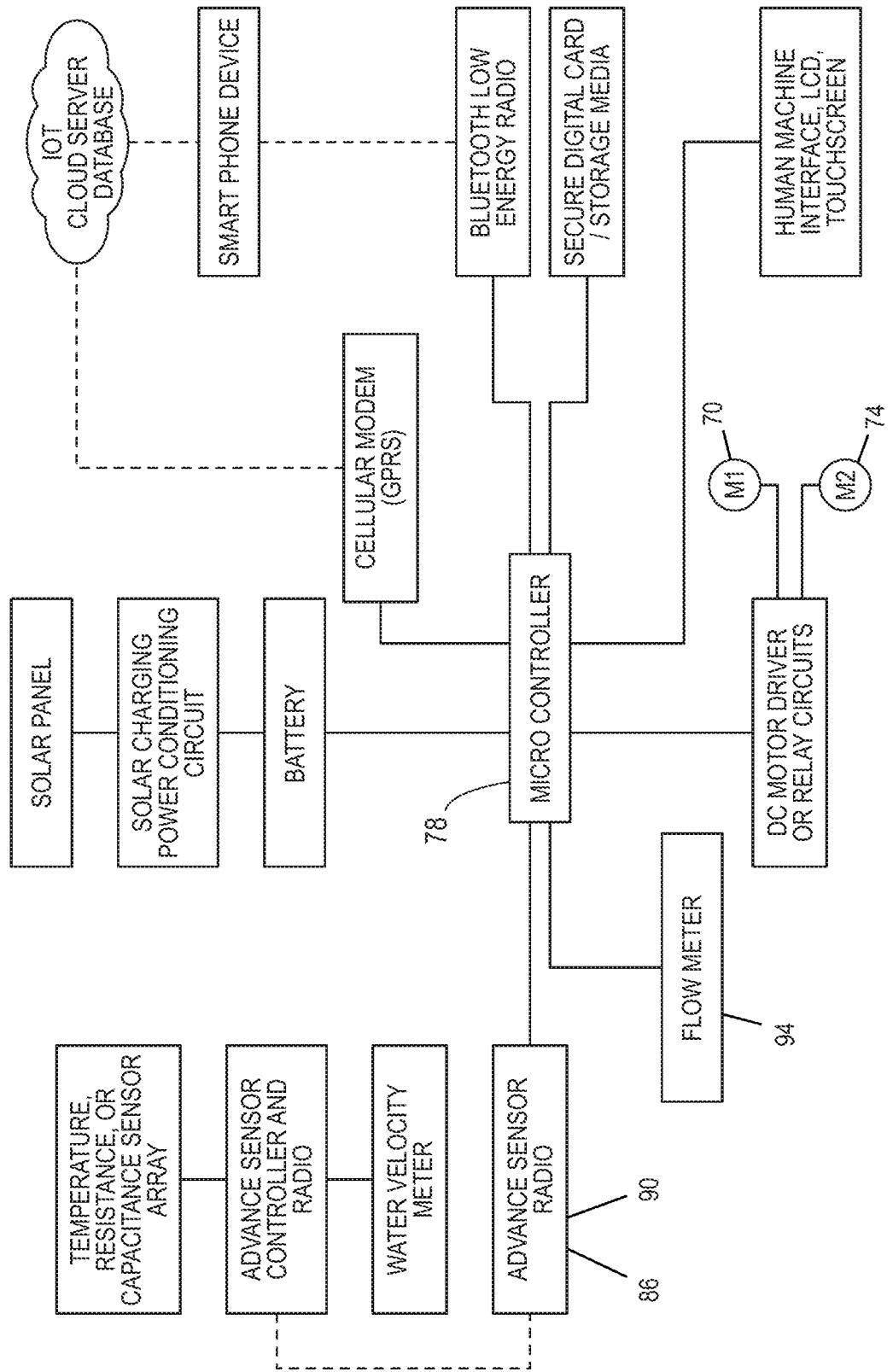
FIG. 7 is a schematic chart illustrating a controller for the surge valve assembly and various connections from the controller to other components of the surge valve assembly.
Figure 8:
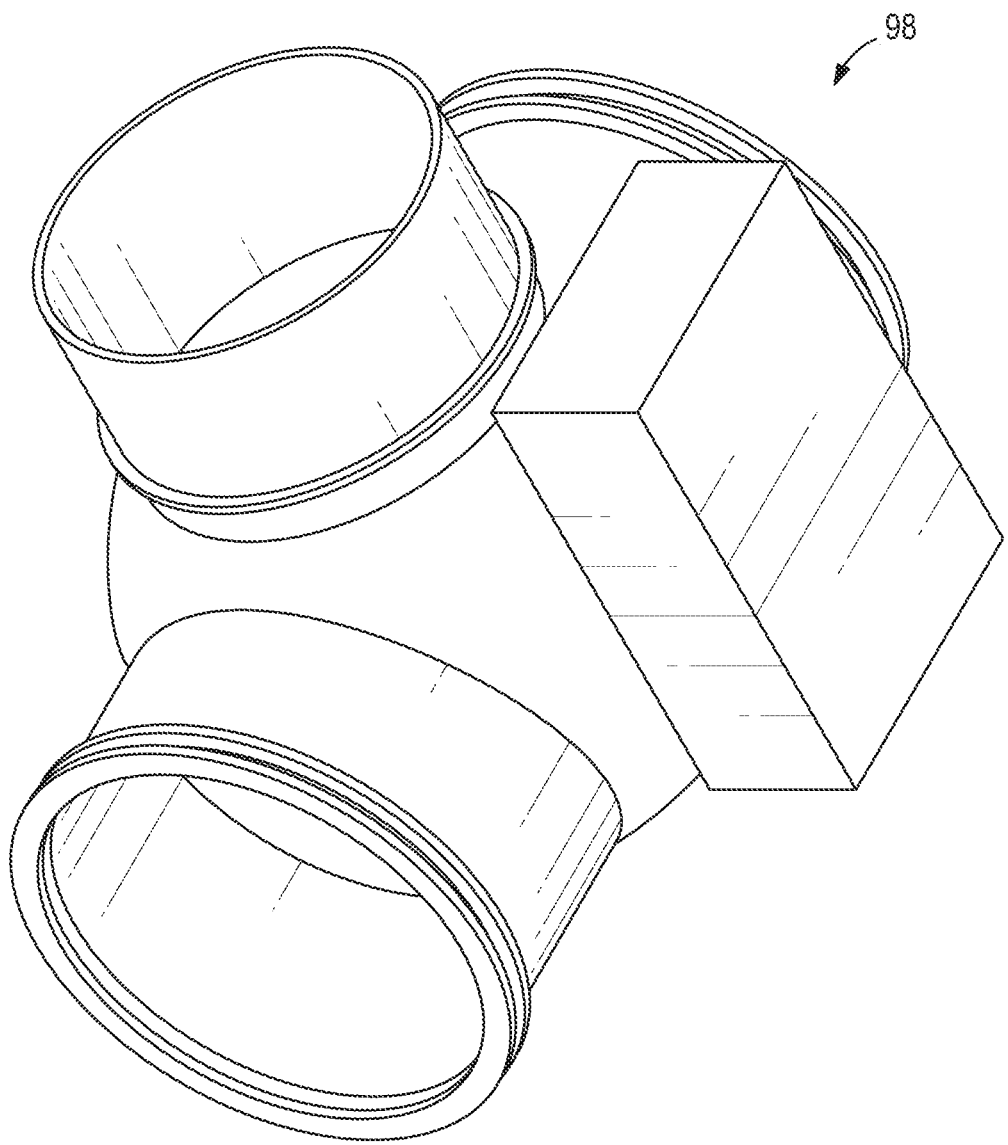
FIG. 8 is a perspective view of a traditional surge valve.

With reference to FIG. 7, and as described above, in some embodiments the controller 78 may be a microcontroller. As illustrated in FIG. 7, the microcontroller 78 may be coupled to a flow meter (e.g., the flow meter 94), an advance sensor radio (e.g., radio for sensor 86 and/or 90), an advance sensor controller and radio, a battery, a cellular modem (e.g., General Packet Radio Service), a Bluetooth® low energy radio, a secure digital card/storage media, a Human Machine Interface/LCD/touchscreen, and/or a DC motor driver or relay circuit. The DC motor driver or relay circuit may be coupled to valves M1, M2 (e.g., the valves 70, 74). The Bluetooth® low energy radio may be coupled to a smart phone device (e.g., personal handheld smart phone device), and the smart phone device and/or cellular modem may be coupled to an IoT (Internet of Things) Cloud server database. The battery may be coupled to a solar charging and power conditioning circuit and to a solar panel, and the advance sensor controller and radio may be coupled to a water velocity meter and/or a temperature, resistance, or capacitance sensor array. Other embodiments include various other connections and combinations of connections than that illustrated.

FIG. 1 illustrates three different cycles (represented as A, B, and C). In the first cycle A, the valve 70 is fully opened at first and the valve 74 is fully closed at first to advance water during the advance stage down the furrows 34 along one side of the field 14. Alternatively, water may first be passed through a fully open valve 74 (while valve 70 is closed). Once one side of the field 14 has been wetted, the other side of the field is then wetted during the advance stage. The wetting front of the water flowing down the field 14 eventually slows as it reaches more dry soil in the field 14. Thus, in the first cycle A only a portion of the field 14 is wetted in each zone 26, 30. The advance program calculates the time for each advance cycle based on the number of cycles to complete an advance through the field. The advance may represent around 50% of the irrigation cycle.

After the advance stage, the controller 78 may then open and close the valves 70, 74 partially or entirely, at a faster and equal pace, allowing a soak stage where at least a portion of the water soaks into the field 14. For example, each valve 70, 74 may be fully opened or closed (or partially closed) to reduce the water flow by 50% (or any other percentage) through each valve 70, 74, and to allow water to flow to each side of the field 14. However, typically in this soak mode, the valve 70 would be open while the valve 74 would be closed (or vice versa). When both valves 70 and 74 are fully open or partially closed, this condition is referred to as soak or a simulated cutback. Because each valve 70, 74 is independently controllable, water may continue to flow to both zones 26, 30 of the field 14 during soak. Thus, the system 10 provides for soak of water to the field 14 without having to rapidly alternate flows of water to each side of the field 14, as is done with current surge systems. When the valves 70, 74 are both completely closed, no water will flow to the field 14, and the water in the field 14 will be allowed to soak into the soil uninterrupted until further water is applied. In cutback mode, both valves 70, 74 would be partially open (e.g., 20-50%) during this phase with no oscillation.

In some embodiments, a power interruption occurs during an irrigation cycle. As described above in current systems (for example the P&R valve that uses a flap valve) when a power interruption occurs one side of the field receives more water than another. The system 10 advantageously allows both sides of the field 14 to still receive the same amount of water during cutback. The system 10 may resume surge irrigation after an interruption (for example a brief suspension of water inflow). The valves 70, 74 may resume according to when an interruption occurred to properly finish the advance phase. Additionally the system 10 may properly resume so that an equal water volume is applied to each side of the field 14.

Once the first advance or surge cycle A is complete, the controller 78 may proceed to a second advance or cycle B, where the valves 70, 74 are again each fully opened and closed (or water flow is alternated between one fully open valve and one fully closed valve), and water again is directed out into the field 14 during an advance stage. Because a portion of the field 14 is already wetted or saturated, the wetting front moves quickly over this portion of the field 14 and advances farther down the field 14 closer to the second end 22 of the field 14. Again, the wetting front of the water flowing down the field 14 eventually slows as it reaches more dry soil closer to the second end 22 of the field 14. Thus, after enough subsequent progressively longer advance cycles, and water has fully advanced through the field so that a larger portion of the field 14 has been wetted. After the last advance stage, a second mode cycle B either a cutback or soak stage takes place, in which the valves 70, 74 are again each partially or fully closed, and where water is allowed to soak into the field 14. Finally, an optional or soak cycle substitute third cycle C, cutback phase, again involving the same steps of advancing water down the field and then entering a cutback stage to allow the water to soak into the soil.

While three cycles are illustrated, in other embodiments the controller 78 may implement three to eight cycles, or other numbers of cycles, depending for example on user inputs. For example, in some embodiments, to control the surge operation for the field 14 an operator may enter inputs such as field area, length of rows, desired water depth (for example 2 acre inches per acre, 3 acre inches per acre, etc.), as well as desired advance times into the controller 78 through the touchscreen display 82 or via other communication with the controller 78. The controller 78 may then use that entered data to set up schedules of one, two, three or more cycles.

Additionally, and as described above, because each valve 70, 74 is independently controllable, in some embodiments the first valve 70 may be opened to a greater extent as compared to the second valve 74 during an advance or soak stage, or the second valve 74 may be opened to a greater extent. Thus, if the field 14 is not uniform in areas of dryness, or if the zones 26, 30 are not of equal size, the valves 70, 74 may accommodate and be used selectively to control the movement of water entering each zone 26, 30.

In some embodiments the valves 70, 74 may operate on solar power (for example via a solar panel) and a battery, or via another power source. The voltage of a battery and a solar panel may be monitored by controller 78 to ensure proper operation of valves. The controller 78 may be charged and turned off in the off-season, or after an irrigation event. In some embodiments the valves 70, 74 are operated via relays or a motor driver.

The time to irrigate each zone 26, 30 may be combined into a total irrigation set time. The total irrigation set time includes all advance times and soak times for the field 14 during the various cycles A, B, C. In some embodiments the total irrigation set time preferably does not exceed 40 hours, although 24-30 hours may be preferred for some geographical regions. Additionally, while the surge advance times for each cycle A, B, C may typically increase in length during the surge irrigation, in some embodiments the first advance time will generally be less than the second advance time and so forth. Individual advance times and the number that occur are calculated as a function of the total advance time and are a function of field dimensions and soil types. Initial settings for these parameters are preselected for the irrigator based on field size, row length and soil type.

Additionally, in some embodiments the surge valve assembly 42 (or the controller 78 thereof) may be set differently depending on soil condition. For example, surge valves are especially useful in in sandy soils, as the challenge with coarse textured soils is minimizing deep percolation and getting water through the furrow. Thus, the surge valve assembly 42 may be operated normally, although one might expect a longer advance time than normal (for example greater than 50% of the irrigation set time). Default cycle times may be used. Increasing the number of cycles (i.e., the number of advance cycles (water on/water off) used to complete a surge advance program) may improve the irrigation in these conditions.

In silt loam soils, surge valves may be useful, particularly in silt loams that seal. In silt loams that do not seal and infiltrate well, the same process described above for sandy soils may be used. For silt loams that seal, substantial changes may be made to the program operated by the controller 78. For example, often in silt loams that seal, the advance time will be much less than expected. For example for a total irrigation set time of 24 hours, the advance time may be completed in 6 hours. The advance time may be adjusted to 5 hours, and the number of advance phases may be increased by +1 or +2. The surge valve assembly 42 may be put in a soak mode for a remainder of the irrigation set, and the flow rate may be reduced (i.e., by partially or entirely closing the valves 70, 74) to increase opportunity time (i.e., time for water to infiltrate the soil). The more opportunity time water has in contact with the soil, the greater the volume that is infiltrated.

In cracking soils (for example clay soils), the surge valve assembly 42 may be used only, for example, in an advance mode. The advance time may be set to the total irrigation set time. The surge valve assembly 42 may thus not be programmed to operate in a soak mode in these soil conditions. Also, the number of advances may be reduced so that there are only 3-4 advance cycles. The surge valve assembly 42 may work in a clay soil because during an off cycle (e.g., when both valves 70, 74 are closed) the soil cracks seal up and allow the advancing water to quickly move through the furrow on the next advance.

As discussed above, a CHS plan may be provided for the holes in the lay-flat pipes 62, 66. The CHS plan may be used to plan the advance time. For example, if a CHS plan calls for a 24 total irrigation set time, then a 12 hour total advance time (i.e., the total amount of time the system is in an advance stage) may be expected. However, the advance time is highly variable. Thus, the user may be required to determine the advance time from experience, so the advance time may be monitored during a first irrigation cycle until it is known or can be predicted. For example if a 24 hour total irrigation set is required to put on a 2.5 ac-in application of water depth (i.e., 2.5 inches of water applied to the field), and it is observed that the advance is halfway through the field at 9 hours, then the advance time may need to be adjusted down from 24 hours to 18 hours.

The use of the system 10 overall may reduce tail water volume because the water is moving as a pulse over the sealed furrows 34 to the end of the furrow 34. Its velocity decreases as it moves along the furrows 34 and has more time to infiltrate before it leaves the furrows 34. When the controller 78 is used or programmed properly, very little tail water (i.e., water that does not infiltrate into the soil of the field and instead enters the tail ditch) may leave the furrows 34.

Use of sensors may also be implemented into the system 10 to provide feedback to the controller 78, so that the controller 78 may adjust or alter advance times (i.e., the duration of each advance stage) and soak times (i.e., the duration of each soak stage). For example, as illustrated in FIG. 1, the system 10 may include at least one advance sensor 86 that measures a velocity of the water leaving the lay-flat pipes 62, 66 during the advance stage. The advance sensors 86 may be located for example at the first end 18 of the field 14 as illustrated in FIG. 1. The advance sensors 86 may be located within or adjacent the lay-flat pipes 62 and 66, or adjacent to and downstream of the valves 70, 74 within the first pipe arm 54 and the second pipe arm 58.

The advance sensors 86 may be flow meters such as ultrasonic or Doppler velocity sensors or other types of sensors that measure fluid velocity. The advance sensors 86 may be in communication with the controller 78 (for example wirelessly) to provide signals to the controller 78 regarding the velocity of water moving past the advance sensors 86. This information may then be used to calculate or adjust advance times (knowing for example furrow length, field length, etc. from the Human Machine Interface). If the advance sensors 86 detect that the velocity of the water is changing, the controller 78 may then adjust and change the advance time that is used during a cycle or cycles of a program. In some embodiments, one or more advance sensors 86 are disposed farther down along the field, closer to the second end 22 of the field. The advance sensors 86 may be able to provide an indication of where water may be slowing down or speeding up in the field 14 (for example due to raised and lowered areas and areas of different concavity in the field 14), and the controller 78 may then be able to adjust and alter the advance times and/or soak times.

With reference to FIG. 1, the system 10 may also or alternatively include at least one temperature sensor 90 (or other sensor) disposed downfield from the first end 18 of the field 14 (e.g., halfway down the field 14). Once the advance of water reaches the temperature sensors 90, the temperature sensors 90 may detect a change in temperature (or flow velocity), and send this information to the controller 78. The controller 78 may then be able to calculate how long it took the water to reach the temperature sensors 90. The sensors 86 and/or 90 may thus be used to monitor the movement of water in the field 14, and to assist the controller 78 in adjusting a cycle or program of cycles during a surge operation.

In some embodiments, one or more sensors may be part of a soil moisture monitoring unit (e.g., located where element 90 is referenced in FIG. 1). In one embodiment, several sensors are located at one or more positions in the field 14 monitoring and averaging the advance time in many furrows 34 in close proximity. In another embodiment, a capacitance or resistance sensor may be used to sense water presence in the field 14. One or more sensors may also be used to establish when the advance reaches the end of the field 22 or tail ditch 38 (e.g., may be located at the second end 22 of the field 14).

In some embodiments, the sensors 86, 90, 94 may measure velocity instantly using images or sense water change from resistance or capacitance changes. The water velocity may be measured using Doppler or ultrasonic frequencies. Two sensors pairs may be used. One may emit a signal that is reflected back and the other sensor may receive the reflected signal. The delay is proportional to the velocity. In some embodiments, one or more of the sensors 86, 90, 94 described herein may be submerged in the furrow flow. The sensors 86, 90, 94 may be wired to the valve controls. The sensors 86, 90, 94 may use, for example, a radio signal (900 mHz, LoRa) to send the velocity measurement to the controller 78.

In some embodiments, if the power to the controller 78 and/or to one or more of the sensors 86, 90, 94 is interrupted, the valves 70, 74 will pause and/or automatically close, and then resume again once power is restored. In yet other embodiments, the valves 70, 74 may continue to operate. The controller 78 and/or the sensors 86, 90, 94 may be powered for example via solar power, via batteries, or via a central power source.

In some embodiments, combining the information of the flow of water from the advance sensors 86 (and/or other sensors 90, 94) allows for the valves 70, 74 to adapt and operate without any user input. The surge program may adaptively alter the advance and soak times to successfully complete a surge irrigation set.

The system 10 may adaptively alter the surge and soak times based on flow volume. For example, in general, irrigation flows decrease during an irrigation season because of drawdown in wells and surface water sources. Surge valves are set during the first irrigation and thus the program is likely set with an advance time that is too long for the end of the season reducing the efficiency of surge irrigation by generating unnecessary runoff. The system 10 may provide user application depth information and save the user information (for example on an SD card). The system 10 may stop irrigation when user specified application time has been reached (for example total irrigation time and applied volume may be tracked and saved to the SD card). The system 10 may provide for automatic irrigation termination when used with a pressure cutoff switch at a pump.

As described above, the system 10 may use a touchscreen. The touchscreen, such as touchscreen 82 illustrated in FIG. 4, may be a Human Machine Interface where all parameters of the valves 70, 74 are displayed, including percent area of each side, advance time, soak or cutback mode, flow rate, volume applied, time remaining, area, application depth, cycle times, charge status and battery level. Alternatively, another embodiment utilizes a Liquid Crystal Display (LCD) screen showing these parameters and a wireless communication radio (either low energy blue tooth or wifi, 802.11g) where the human machine interface is through a smart phone device. A mobile app is used to program and set the valve and the LCD screen is a backup.

In some embodiments, the system 10 may be adapted to an existing surge valve. For example, the system 10 may include two parts. First, the controller 78 that actuates the existing valve. In this embodiment the controller 78 may be adapted to fit existing valve bodies for surge. The system 10 may include an adapter to add a flow meter (for example similar to the flow meter 94) to the valve body. A motor may move the existing valve back and forth forcing water from one side of the valve to the other. For example, the controller 78 may move the valve to a middle position allowing for cutback irrigation, or may move the valve to other angles to change the flow of water. The system 10 may automatically adjust the program based on feedback from the flow meter 94.

In other embodiments, and as described above, multiple valves 70, 74 (for example butterfly valves) may be used in a Y configuration (for example as seen in FIG. 1, for lay flat pipe installations). In other embodiments, the butterfly valves may be in a T configuration (for gated pipe installations). In some embodiments, water may be forced through one valve 70, then the other 74. When cutback is desired, both valves may be opened (for example mostly opened/ partially closed).

As described above, the system 10 may use an optional furrow velocity sensor (for example the flow meter 94) coupled to the valve to sense furrow velocity which can determine advance, soak, and cutback times, allowing for adaption to inflow changes and furrow flow changes from slope. Thus, the user does not have to estimate advance times or monitor an irrigation event to accurately program the valve 70, 74. Irrigation furrow velocities may change during the season and the system 10 adapts the surge program according to these changes. It is well known that the first irrigation takes more time and water, because the soil has better infiltration characteristics. Thus, the user may enter the area of the field 14 and the average row length and the application depth desired, the system 10 (for example controller 78) calculates the rest from these inputs. These inputs are known by the user, where the advance time is a guess. The system 10 may thus integrate furrow velocity over time to predict an advance time for the field.

In some embodiments, the system 10 may initiate a surge irrigation program when flow is detected by one of the flow meters 94. When the system 10 initiates a surge irrigation program, it may adjust the advance time based on the flowrate difference between the most recent flowrate and previous flow rates. If irrigation inflow is interrupted, the surge program may be paused and resumed when flow resumes. Re-initialization may require additional water (or time) applied to one side to finish the advance when interrupted. Re-initialization of the advance is done so that the field may be uniformly irrigated.

In cutback mode the valves 70, 74 may reduce flow volume to a predetermined level by using feedback from the flow meter 94. In soils that seal, and a large cutback volume is needed, the valves 70, 74 can reduce the flow to that desired by the user. For example, if the flow is 1000 gpm when the valve 70 is fully open during advance and 74 is closed, then when in cutback mode, both valves 70, 74 are opened reducing flow to 500 gpm per side. However, the valves 70, 74 could reduce the flow to both sides to 300 gpm by closing both valves down slightly at the same time. The valves 70, 74 can end the irrigation event by closing both valves 70, 74 at the same time after the predetermined irrigation depth has been applied. When used in conjunction with a pressure shutoff switch at a pump this allows for unattended and accurate irrigation termination.

System 10 by way of controller 78 may also have a connection to the internet of things, through a cellular modem as part of controller 78. The modem may use General Packet Radio Service (GPRS) or similar service to connect to a database on a server through an internet connection. The system 10 and remote server may communicate using the Transmission Control Protocol (TCP) connection, Hyper Text Transfer Protocol, Transport Layer Security (TLS) or other similar protocols to transmit data on the advance time, area, flow rate, operation time. This may be done through a secure encrypted connection using a Secure Hash Algorithm (SHA) transmitting a format such as a JavaScript Object Notation (JSON) string between the web server and the system 10. The system may also provide data through the Short Message Service (SMS).

Although the invention has been described in detail with reference to certain preferred constructions, variations and modifications exist within the scope and spirit of one or more independent aspects of the invention as described.

What is claimed is:

1. A surge irrigation system comprising:
a main inlet pipe configured to be coupled to a source of pressurized water;
a first pipe arm extending and branching off from the main inlet pipe and configured to extend toward a first irrigation zone in a field;
a second pipe arm extending and branching off from the main inlet pipe and configured to extend toward a second irrigation zone in the field;
a first independently controlled valve configured to control water flow rate through the first pipe arm; and
a second independently controlled valve configured to control water flow rate through the second pipe arm;

a controller coupled to both the first independently controlled valve and the second independently controlled valve and configured to control both the first independently controlled vale and the second independently controlled valve;

wherein the first and second independently controlled valves are configured to be opened and closed independently of one another, and wherein the controller is configured to open at least one of the first independently controlled valve and the second independently controlled valve to a partially open state during a cutback mode.

2. The surge irrigation system of claim 1, wherein the first and the second independently controlled valves are each butterfly valves.

3. The surge irrigation system of claim 1, wherein the first independently controlled valve is disposed within the first pipe arm and the second independently controlled valve is disposed within the second pipe arm.

4. The surge irrigation system of claim 1, further comprising at least one sensor coupled to the controller, wherein the sensor is disposed within the field downstream of the first pipe arm and the second pipe arm.

5. The surge irrigation system of claim 4, wherein the at least one sensor includes an advance sensor configured to measure water flow velocity.

6. The surge irrigation system of claim 4, wherein the at least one sensor includes an advance sensor configured to measure water temperature.

7. The surge irrigation system of claim 6, further comprising radio communication and data signal transmission configured to be used to relay water advance status or controller parameters of the surge irrigation system between at least one sensor station, controller, and graphical user interface of the surge irrigation system.

8. The surge irrigation system of claim 1, further comprising a display coupled to the controller, wherein the display includes user input features configured to be operated by a user to enter and control irrigation schedules for the surge irrigation system.

9. The surge irrigation system of claim 1, further comprising a flow meter disposed upstream of both the first and the second independently controlled valves, or of just a single one of the first and second independently controlled valve.

10. The surge irrigation system of claim 9, wherein the flow meter is configured to monitor a flow rate of water through the first and the second independently controlled valves, and wherein if the flow rate changes, the flow meter is configured to communicate information regarding the flow rate change to the controller.

11. The surge irrigation system of claim 10, wherein the controller is configured to use the information from the flow meter regarding the flow rate change and at least one of an advance sensor, temperature sensor, or other water sensing sensor for the purpose of adjusting an advance time, individual advance cycle times, number of advance cycles, soak times, number of soak cycles, cutback time, cutback percentage, or total irrigation set time.

12. The surge irrigation system of claim 1, wherein the system further includes a flow meter, as well as both an advance sensor configured to measure water flow velocity, and a temperature sensor, both the advance sensor and the temperature sensor disposed within the field and downstream of the main inlet pipe and the first and second pipe arms, wherein the controller is configured to use the information from the flow meter regarding a flow rate change, as well as information from the advance sensor and the temperature sensor, to adjust at least one of an advance time, individual advance cycle times, number of advance cycles, soak times, number of soak cycles, cutback time, cutback percentage, or total irrigation set time.

13. The surge irrigation system of claim 1, wherein the controller is configured to open both the first independently controlled valve and the second independently controlled valve between 20-50% during the cutback mode.

14. A surge irrigation system comprising:
a main inlet pipe configured to be coupled to a source of pressurized water;
a first pipe arm extending and branching off from the main inlet pipe and configured to extend toward a first irrigation zone in a field;
a second pipe arm extending and branching off from the main inlet pipe and configured to extend toward a second irrigation zone in the field;
a first independently controlled valve configured to control water flow through of the first pipe arm;
a second independently controlled valve configured to control water flow through the second pipe arm;
a controller coupled to both the first independently controlled valve and the second independently controlled valve and configured to control the first independently controlled valve and the second independently controlled valve;
a flow meter disposed upstream of the independently controlled valve; and
an advance sensor disposed downstream of the independently controlled valve, wherein the advance sensor is configured to measure water flow velocity;
wherein the controller is configured to open both the first independently controlled valve and the second independently controlled valve such that the first independently controlled valve is opened to a greater extent than the second independently controlled valve during an advance stage.

15. The surge irrigation system of claim 14, wherein the independently controlled valve is a butterfly valve.

16. The surge irrigation system of claim 14, wherein the independently controlled valve is disposed within the first pipe arm.

17. The surge irrigation system of claim 14, further comprising at least one additional sensor coupled to the controller, wherein the at least one additional sensor is disposed within the field downstream of the first pipe arm and the second pipe arm.

18. The surge irrigation system of claim 14, further comprising a display coupled to the controller, wherein the display includes user input features configured to be operated by a user to enter and control irrigation schedules for the surge irrigation system, wherein the display further includes a personal handheld smart phone device and radio communication between the controller and the smart phone device.

19. The surge irrigation system of claim 14, wherein the flow meter is configured to monitor flow rates of water through at least one of the first independently controlled valve and the second independently controlled valve, and wherein if the flow rate changes, the flow meter is configured to communicate information regarding the flow rate change to the controller.

20. The surge irrigation system of claim 19, wherein the controller is configured to use the information from the flow meter regarding the flow rate change to adjust at least one of advance time, individual advance cycle times, number of advance cycles, or soak times.

\* \* \* \* \*